United States Patent Office 3,429,927
Patented Feb. 25, 1969

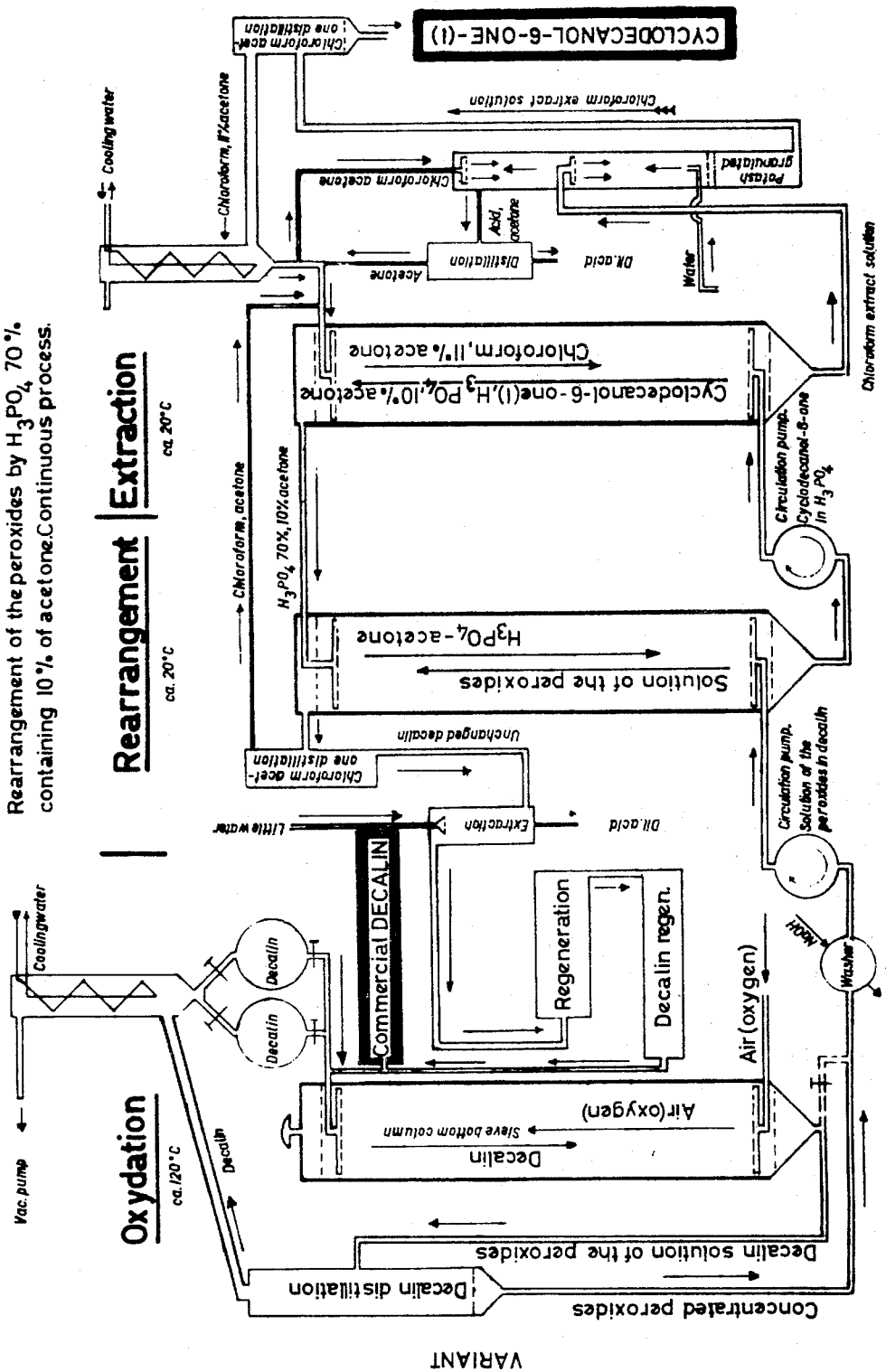
FIG. 3 — Production of cyclodecanol-6-one-(1)

3,429,927
PROCESS FOR THE PRODUCTION OF CYCLODECANOL-(6)-ONE(1)
Albert E. Schnider, Domat, Ems, Switzerland, assignor to Inventa A.G. fur Forschung und Patentverwertung, Zurich, Switzerland
Continuation-in-part of application Ser. No. 262,247, Mar. 1, 1963. This application Mar. 2, 1966, Ser. No. 531,115
U.S. Cl. 260—586      2 Claims
Int. Cl. C07c 45/02, 49/27

ABSTRACT OF THE DISCLOSURE

A process for the manufacture of cyclodecanol-(6)-one(1) from partly oxidized and neutralized decahydronaphthalene, directly from the crude product and without isolation of transdecalyl-9-hydroperoxide obtained in the oxidation from its byproducts. The end product is manufactured by treatment of the crude in a heterogeneous phase with acid catalysts plus 2–15 percent acetone, calculated on the volume of the acid phase present in the reaction.

---

Figure 1:
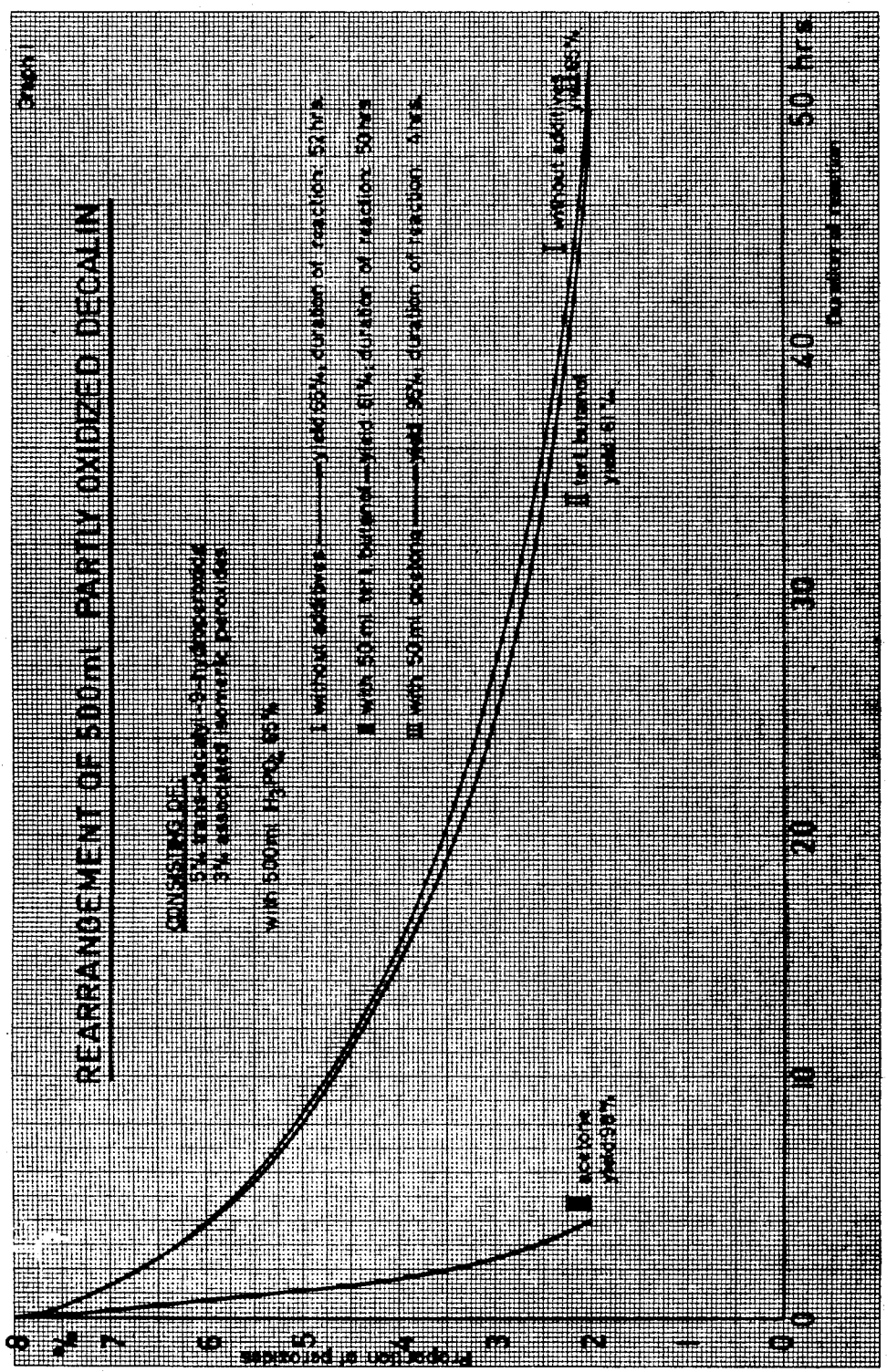
Figure 2:
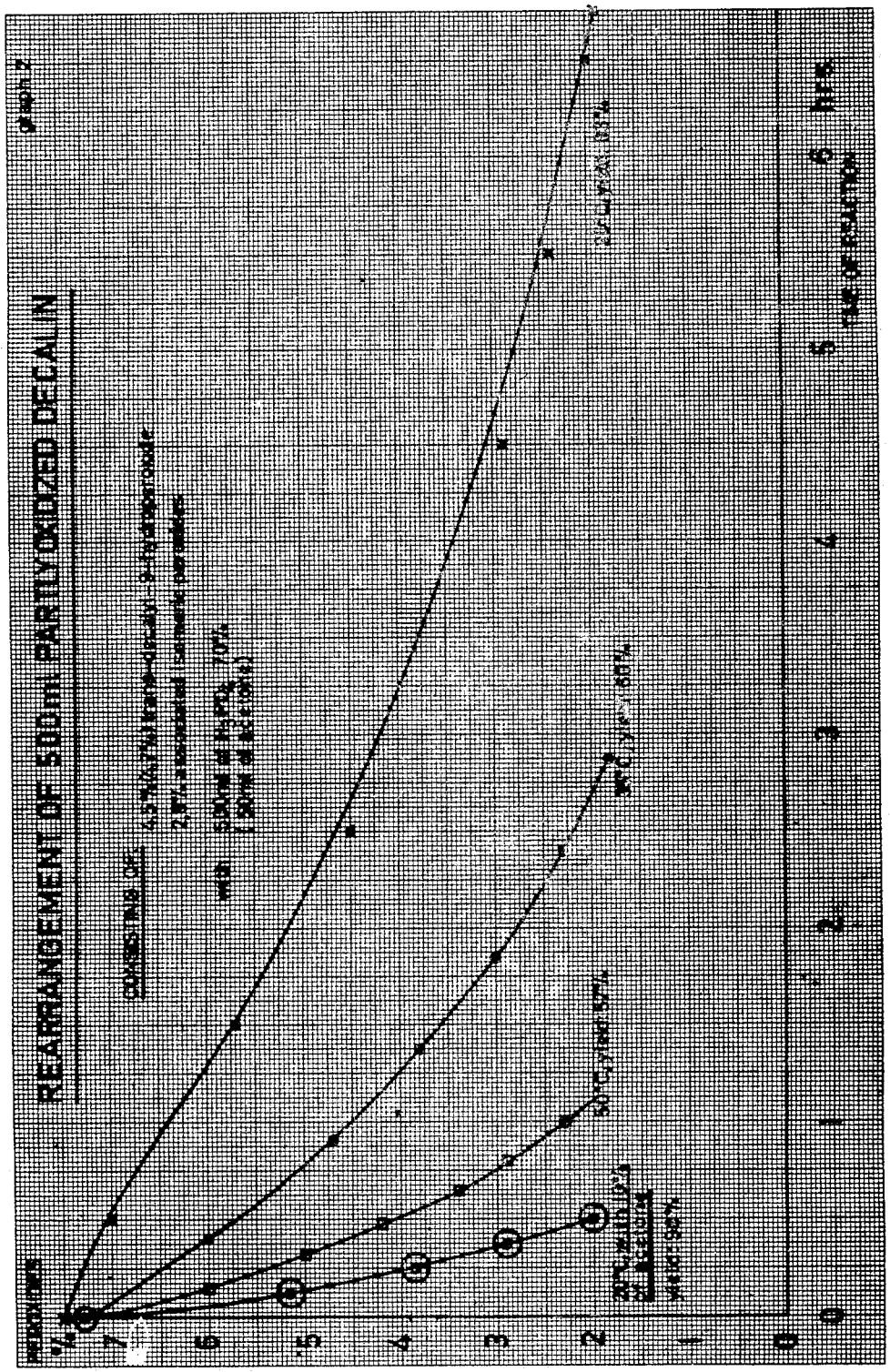

This invention is a continuation-in-part of my copending application Ser. No. 262,247, filed Mar. 1, 1963, now abandoned.

The invention relates to an economical process for the manufacture of cyclodecanol-(6)-one(1) and, more particularly, to such a process on a commercial scale having improved yields and quality of the products obtained.

Cyclodecanol-(6)-one(1) can be produced from transdecalyl-9-hydroperoxide which, according to R. Criegee (B. 77, 1944, p. 22) is formed by the oxidation of Decalin with oxygen. Cyclodecanol-(6)-one(1) is an important stepping stone in the nylon 10-synthesis from Decalin (registered trademark for decahydronaphthanlene) by way of ω-caprinolactam (cf. A. Müller & R. Pflüger) Kunststoffe 50, 1960, p. 205). A known method of preparing cyclodecanol-(6)-one(1) from transdecalyl-9-hydroperoxide consists of the acetylation of that product with acetic anhydride to the acetate of 1-oxy-1,6-oxidocyclodecane and ensuing saponification with methanolic potassium hydroxide, whereby the oxyoxido derivative, forming intermediately, is partly rearranged to the oxyketone (cf. R. Criegee, l.c., p. 722). This process suffers from the drawback that solid peroxide is required which is subject to explosions. It also is not applicable on a commercial scale because of the huge quantities of acetylating agent and the resulting comparatively small quantity of oxidoacetate whose maximum is 45 percent.

Moreover, the isolation of the peroxide entails loss of substance and considerable expenditure.

The direct rearrangement of trans-decalyl-9-hydroperoxide to cyclodecanol-(6)-one(1) has been attempted on the laboratory scale by H. E. Holmquist et al., J. Am. Chem. Soc. 78, 5341 (1956), by heating a solution of 20.0 g. trans-decalyl-9-hydroperoxide, 5.5 ml. conc. sulfuric acid in 3 ml. water in 250 ml. t-butylalcohol at reflux temperature for seven hours and isolating the product after neutralization with sodium bicarbonate in a yield of only 25%.

By reacting the peroxide in a homogeneous phase, using a solvent, conditions that lead to an undue dilution of the acid and higher temperatures, experience shows that it is not possible to obtain a suitable yield of cyclodecanol-(6)-one(1) in commercial large scale production by this method. The process would not be economical for reasons of yield, neutralization of the acid and last but not least because of the use of dangerous solid peroxide as a starting product, isolated by crystallization from partly oxidized decahydronaphthalene, according to R. Criegee, Ber. 77, 22 (1944), as noted by the authors on page 5340 (loc. cit.).

It has now been found that for the production of cyclodecanol-(6)-one(1) on a commercial scale the highly uneconomical isolation of pure trans-decalyl-9-hydroperoxide can be avoided and at the same time the speed of rearrangement and the yield of oxyketone highly increased by carrying out a reaction in a quite different medium, namely directly in the partly oxidized decahydronaphthalene with the aid of definite catalysts and by maintaining particular and controlled reaction conditions. The yield of oxyketone thereby obtained is up to 95%.

The solution resulting from the partial oxidation of technical decahydronaphthalene with oxygen in the liquids phase at 110–130° C. after neutralization consists beside the trans-decalyl-9-hydroperoxide of alien and isomeric peroxides (e.g. cis-decalyl-9-hydroperoxide, etc., ranging in amounts from 0.2–12%), of other neutral oxidation byproducts and unchanged decahydronaphthalene. The isomeric peroxides, contrary to the trans-decalyl-9-hydroperoxide, cannot be rearranged with dilute acid.

A flow sheet of the process appears in FIG. 3.

The process according to the invention for the production of cyclodecanol-(6)-one(1) by the rearrangement of trans-decalyl-9-hydroperoxide and associated isomeric peroxides with the aid of catalysts and ensuing isolation of the cyclodecanol-(6)-one(1) from the reaction medium is characterized by the method whereby said peroxide mixture formed in partly oxidized decahydronaphthalene is treated directly in said solution with acid catalysts in heterogeneous phase, finely dispersed by means of agitation, and especially in the presence of definite neutral organic hydrophilic catalysts which boost the rearrangement effect of the acid in yield and speed of reaction. This is followed by the extraction of cyclodecanol-(6)-one(1) from the acid layer and distillation of the extract.

The cause of the unexpected action of neutral catalysts, particularly acetone, in the heterogeneous reaction medium may be found in the capacity of such substances to act as "solution promoter" or "solution mediator" or in forming addition products with the peroxides. While the exact causes of this phenomenon have not been fully established, it can be stated as a fact that not every common solvent shows said effect, e.g., t-butanol, employed by Holmquist et al. as a solvent, has absolutely no influence on the reaction in the heterogeneous phase, whereas the effect of acetone in this medium is highly surprising as shown in the accompanying drawing, FIGURE 1.

Aqueous solutions of sulfuric acid, phosphoric acid and perchloric acid have been found especially suited as acid catalysts. Mixtures of organic with inorganic acids, such as for instance, acetic acid and sulfuric acid, also can be employed with good results. In the latter instance, beside the cyclodecanol-(6)-one(1), its acetate also forms which, however, is readily saponified. In a like manner, 1,6-oxidocyclodecane, forming under certain reaction conditions as byproducts in small quantities, can easily be converted into cyclodecanol-(6)-one(1) through hydration by means of aqueous mineral acids. The reaction temperatures range from 0 to 80° C. The addition of definite solvents as catalysts to the heterogeneous reaction mixture has proved very advantageous, e.g., the employment of actetone. This substance is to be considered as a special catalyst for the process in a heterogeneous medium.

The influence of suitable solvents on the duration of the rearrangement and thus upon the yield of cyclodecanol-(6)-one(1) is not uniform. It has surprisingly been established that among the lower ketones particularly acetone exerts a strongly accelerating action on the speed of the rearrangement reaction of the peroxides in the partly oxidized decahydronaphthalene, within the temperature limits of −10 to 40° C. (at corresponding decreasing concentrations of the inorganic acids). This also leads to an increase in the yield of cyclodecanol-(6)-one(1). These effects are much less pronounced when ether is employed. Tetrahydrofurane, dioxane, and alcohols have no influence at all.

Addition of cyclodecanol-(6)-one(1) strongly decreases the yield at higher temperatures, due to the decomposition by the acid, and at lower temperatures due to a reaction with the peroxides; however, the substance can be applied at temperatures below 15° C. in the presence of acetone especially for the purpose of maintaining a suitable concentration of cyclodecanol-(6)-one(1) in the mineral acid. A constant amount of approximately 5 percent of the reaction product reduces the required quantities of extractant in a continuous process. (The oxyketone is not attacked in concentrations below 10 percent in decahydronaphthalene during the oxidation.) The impurities and the concentration of trans-decalyl-9-hydroperoxide in the decahydronaphthalene oxidation solution does not substantially affect adversely the yield of the rearrangement product, if acetone is added in the heterogeneous phase.

It is possible to employ solutions of low concentration, e.g., 5 percent, as well as highly concentrated solutions, e.g., 50 to 60 percent. However, the yield and the purity of the cyclodecanol-(6)-one(1) can be increased somewhat by treating the oxidation solution, prior to the rearrangement, with an ion exchager or by washing it with an alkaline solution, and, under certain conditions, by concentration through distillation of a part of the decahydronaphthalene (see Example 10).

The application of dilute mineral acids (concentrations up to approximately 1 per mil) requires, at a reaction time of approximately 8 to 32 hours, temperatures up to approximately 100° C. and comparatively large volumes of excess acid, i.e., up to 10 times the volume of the peroxide solution. In a heterogeneous reaction medium, a fine suspension is a strict requirement in order to attain good yields.

The reaction time in the heterogeneous phase depends upon the acid concentration, the peroxide concentration, the acetone concentration and also upon the temperature, whereby the yield of cyclodecanol-(6)-one(1) strongly decreases when the optimum temperature valid for given concentrations is exceeded as is shown in FIGURE No. 2 of the accompanying drawings. Higher acid concentrations generally require correspondingly lower temperatures. When working batchwise, it is of advantage to rearrange the peroxides not quantitatively but only up to a residual content of 20 to 10 percent of the starting concentration, since the yield on rearrangement product decreases with increasing dwelling time. The solutions obtained by the decahydronaphthalene oxidation with air (oxygen or by applying catalysts (e.g., benzoylperoxide, benzaldehyde etc.) in most instances contain, as mentioned above, beside the trans-decalyl-9-hydroperoxide, other oxidation products which precipitate iodine from acid potassium iodide solution. Some of these oxidation products present in small amounts do not yield oxyketone. But in any event it also is an important fact that greater amounts of isomeric peroxides are present which do not tend to crystallize (R. Criegee, l. cit., p. 23). In addition thereto it has been found that from other liquors which are practically free from trans-decalyl-9-hydroperoxide but consist of isomeric peroxides, additional cyclodecanol-(6)-one(1) can be obtained by treating the solution with strong acids, in amounts of at least 5 percent of the separated trans-decalyl-9-hydroperoxide. Approximately 20 percent of the total peroxide content given in the examples following below relates to such isomeric peroxides, except Example 3, wherein, under the conditions given (diluted acid), the greatest part of these peroxides does not convert to cyclo-decanol-(6)-one(1).

The direct use of partly oxidized decahydronaphthalene for the purpose of economical manufacture of the cyclodecanol-(6)-one(1) is only possible by the stated catalytic effect of acetone for reasons of speed of reaction. Especially isomeric peroxides react, if rearranging time is not short enough, with oxyketone already formed, strongly reducing the yield of cyclodecanol-(6)-one(1). Omission of acetone thus leads to a decrease in yield, as is evident from the following table:

| Peroxides, percent wt. | Acetone, ml. | Additional oxyketone, g. | Temp., ° C. | Time, hrs. | Residual peroxides, percent wt. | Yield oxyketone, percent wt. |
|---|---|---|---|---|---|---|
| 7.5 | 50 | | 15 | 1.4 | 2 | 98 |
| 7.5 | | 50 | 15 | 7.5 | 2 | 60 |
| 7.5 | 50 | 50 | 15 | 1 | 2 | 96 |

Partly oxidized decahydronaphthalene, 500 ml.; phosphoric acid 70%, 500 ml.; agitated with a vibro-mixer.

As mentioned above, it is not possible to attain a suitable yield of cyclodecanol-(6)-one(1) by a reaction in the homogeneous phase because this leads to undue dilution of the acid, higher temperature and longer duration of the reaction.

The following shows the different rearrangement effects obtained with different acids and acid concentrations.

Acetic acid (e.g., 50%) is not particularly suited for the rearrangement of the peroxide in partially oxidized decahydronaphthalene because, at the required temperatures of 80 to 100° C., the acid volume to be employed must amount up to 10 times the volume of the peroxide solution in order to sufficiently suppress the formation of bicyclic byproducts. However, by entering a solution of approximately 50 percent peroxide content in a mixture of glacial acetic acid with 80 percent sulfuric acid (acid volume proportion 3:2) at −5° C. to 0° C., cyclodecanol-(6)-one(1) can be obtained or its acetate, respectively. The latter, as stated above, can readily be saponified.

A mixture of oxyketone and ester which is easier to convert is obtained by using an excess acetic acid with small quantities of concentrated sulfuric acid or acid ion exchange resin. The latter then can easily be removed with sodium acetate or with a strong anion exchanger (see Example 7).

Using 50 percent sulfuric acid and partially oxidized decahydronaphthalene of approximately 10 percent peroxide content, the peroxide rearrangement can be increased up to 90 percent at low temperatures and at suitable concentration and volume proportions (e.g., 1 part solution:4 parts acid: whereas, upon use of dilute sulfuric acid while warm, cyclodecanol-(6)-one(1) yields of at best 75 to 80 percent are attained under formation of bicyclic byproducts.

Reactions using 50% sulfuric acid and an addition of 5 to 10 percent acetone, calculated on the acid volume, give increased yields. Moreover, this leads to a sulfuric acid volume 5 times lower and to a reaction time shortened 10 times.

Phosphoric acid, polyphosphoric acid and perchloric acid have a better effect with regard to yield and reaction time than sulfuric acid. Also employable are cation exchangers in their H form, in the presence of water, and at elevated temperatures.

Reactions in a homogeneous phase with partly oxidized decahydronaphthalene, the latter containing 10–50 percent trans-decalyl-(9)-hydroperoxide including isomeric peroxides, give yields inspite of the presence of acetone which do not approach those obtained with the oxidation solution in heterogeneous phase, whereby an employment of more concentrated acids is possible. Such a homogeneous phase, is, e.g., an acetone-sulfuric acid mixture, wherein the amount of acetone must be approximately twice that of the total volume of acid and oxidation solution. In weakly acid acetone-decahydronaphthalene-decalylperoxide solutions, the tendency toward formation of bicyclic byproducts, e.g., oxidocyclodecane, cyclopentano-cycloheptanone, trans-9-decalol, and of polymerization products, is more pronounced, especially at elevated temperatures. For instance, a starting mixture of 55 ml. of a decahydronaphthalene oxidation solution containing 50% peroxide in 200 ml. acetone with 75 ml. 10% sulfuric acid, at 60° C. within 20 hours, gives a yield of 65 percent.

If oxidocyclodecene has formed as a byproduct, it can be converted easily into cyclodecanol-(6)-one(1) by boiling for one-half hour with sulfuric acid in the presence of acetone (see Example 9).

Refining of heterogeneous reaction mixtures for the purpose of isolating the reaction product is carried out by extracting the cyclodecanol-(6)-one(1) from the acid layer with a chlorinated hydrocarbon, e.g., chloroform or trichloroethylene; extraction of the oxyketone from the decahydronaphthalene layer with water or aqueous mineral acids, and extraction of the thus obtained aqueous or acid solutions with a chlorinated hydrocarbon and concentration of the extract solutions, from which prior thereto traces of acid had been removed by agitation with potash granulate.

When a sufficiently high level of reaction product is maintained in the acid, the oxidation solution itself can be used as extractant. The latter, in this instance also, should contain as little as possible remaining peroxide. This obviates the need of employing chlorinated hydrocarbons and had the added advantage that distilled decahydronaphthalene can be used for the renewed oxidation.

When volatile organic acids have been used as acid catalysts, the cyclodecanol-(6)-one(1) can be recovered from the acid layer by evaporation.

It goes without saying that, in a continuous process (cf. Example 11), the decahydronaphthalene oxidation solution, which is more or less free from peroxide, can be freed from entrained acetone and other impurities, after extraction of the cyclodecanol-(6)-one(1) together with the mineral acid. Subsequently, it can again be oxidized. From the acid layer, which retains the bulk of the acetone, the cyclodecanol-(6)-one(1) is extracted countercurrently with a chlorinated hydrocarbon, e.g., CHCl₃, which has the best extraction efficiency and itself is mixed with acetone, so that the resulting concentration is in equilibrium with the acetone concentration in the acid layer.

The following examples show that the process can be carried out continuously as well as batchwise.

The degree of purity (boiling point 155–165° C./12 mm. Hg of the distilled and solidified rearrangement fractions) is 99 to 99.9 percent, whereby notice is to be taken that the substance, as has been established gaschromatically, consists of two isomers which are in the equilibrium of 99.9 to 0.1, in accordance with the Equation 1.

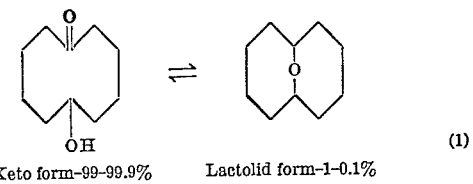

Keto form-99–99.9%    Lactolid form-1–0.1%    (1)

(see R. Criegee & W. Schnorrenberg, A. 560 (1948)). Small changes in the equilibrium proportions bring about a comparatively large change of the melting point, which according to the literature is 70° C. An additional purification can be effected by renewed distillation or recrystallization from cyclohexane or diisopropylether. The equilibrium of the isomers thereby is changed slightly. The melting points of such crystallisates are between 60 and 71° C.

The invention now will be further explained by the following examples. However, it should be understood that these are given merely by way of illustration, not of limitation, and that numerous changes may be made to the details without departing from the spirit and the scope of the invention as hereinafter claimed.

EXAMPLE 1

300 ml. partly oxidized decahydronaphthalene taken from a batchwise decahydronaphthalene oxidation process carried out in the liquid phase with 450 ml. decahydronaphthalene (cis/trans approximately 1:1) and 100 l./h. air at a temperature of 110–120° C. during 24 hrs., having, after extraction of the acid products with aqueous NaOH (10%) a concentration of 160 g. peroxide mixture per liter consisting of approximately 120 g. trans-decalyl-9-hydroperoxide and 40 g. isomeric peroxides, were rearranged with 600 ml. 50% sulfuric acid for 16 hours at 13° C. while stirring intensely. The residual peroxide content of the oxidation solution was 1.3 percent, determined by iodometrical titration in glacial acetic acid. The chloroform extracts from the sulfuric acid layer as well as from the aqueous extraction solution of the decahydronaphthalene layer yielded 36 g. cyclodecanol-(6)-one(1) by distillation between 150 and 170° C. at 12 mm. Hg. The decahydronaphthalene phase contained 1.9 g. 1,6-oxidocyclodecene, as determined gas chromatographically. These were converted to 2 g. oxyketone by treating with 50% sulfuric acid. The total yield on cyclodecanol-(6)-one(1), of a boiling point of 155–165° C./12 mm. Hg, calculated on the reacted peroxide, was 86 percent.

The chloroform extracts in all instances always were shaken with powdered potash to remove residual acid since otherwise the oxyketone decomposed during distillation.

EXAMPLE 2.

1175 ml. partly oxidized decahydronaphthalene from a decahydronaphthalene oxidation process carried out under the same conditions as in Example 1 and concentrated by distillation of decahydronaphthalene to 500 ml. of an oxidation solution having a 40 percent peroxide content in the ratio of approximately 3:1 trans-decalyl-9-hydroperoxide to isomeric peroxides, were emulsified during 24 hours at 15° C. with 500 ml. 48% sulfuric acid in a mixing vessel. The chloroform extracts from the sulfuric acid phase and from the aqueous extract solution of the oily layer yielded 27 g. oxyketone, including 3 g. obtained by hydration of oxidocyclodecene in the decahydronaphthalene layer, corresponding to a yield of distilled rearrangement product of 90 percent with a residual peroxide content of 2 percent; the product having a boiling point of 157–167° C./12 mm. Hg.

When the sulfuric acid volume in the same setup was increased to 2.25 liters, reaction time was reduced from 24 hours to 2 hours at equal yield and with a residual peroxide content of 3 percent. The product isolated weighed 22.5 g.

EXAMPLE 3

2700 ml. decahydronaphthalene (cis/trans approximately 1:1), oxidized at 115–120° C. by means of 1 liter air per minute during 8 hours, showed, after the extraction of the acid products with an aqueous solution of NaOH, a peroxide content of 75 g. per liter consisting of 60 g. trans-decalyl-9-hydroperoxide and approximately 15 g. isomeric peroxides. 500 ml. of this oxidation solution were suspended in 2.25 liters 10% sulfuric acid as finely as possible by means of a vibromixer at 60° C. during 8 hours. The chloroform extract plus the hydration of oxidocyclodecene formed yielded, after distillation, 14 g. cyclodecanol-(6)-one(1) at a residual decalyl peroxide content of 4.2 percent. The yield on oxyketone having a boiling point of 155–165° C./12 mm. Hg was 85 percent.

The decahydronaphthalene solution was readjusted to the original peroxide content by distilling decahydronaphthalene and then again was treated with 10% sulfuric acid.

EXAMPLE 4

500 ml. decahydronaphthalene oxidation solution of 70 g. decalylperoxide content per liter, obtained by a weak dilution of the partly oxidized decahydronaphthalene in Example 3, were stirred to an emulsion with an equal volume 70% phosphoric acid at 15° C. 50 ml. acetone were added thereto, and the mixture stirred 1.4 hours. Refining of the reaction mixture by extraction with chloroform and water, respectively, yielded oxyketone in a quantity of 23.8 g., corresponding to 97 percent considering a residual peroxide content of 2.1 percent. The boiling point was 155–165° C./12 mm. Hg.

EXAMPLE 5

The rearrangement of the decalylperoxide in 500 ml. partly oxidized decahydronaphthalene containing a total of 40 g. peroxides obtained in the same manner and proportions as described in Example 3 was carried out with an equal volume 50% sulfuric acid in such a manner that the acid was mixed with 75 ml. acetone, and this mixture emulsified with the peroxide solution within 25 minutes at 15° C. After extraction with chloroform and distillation of the extraction residue, 27 g. oxyketone and 1 g. oxidocyclodecene resulted, which were hydrated to cyclodecanol-(6)-one(1). The total yield of the latter, distilled between 155 and 167° C./12 mm. Hg, was 93 percent, with a residual peroxide content of the oxidation solution of 2 percent.

EXAMPLE 6

500 ml. of a decahydronaphthalene oxidation solution having a 40 percent peroxide content (obtained by an analogous decahydronaphthalene oxidation process as described in Examples 1 and 2, respectively) in 2 liters 10% perchloric acid were produced by means of a vibro-mixer, and the peroxide rearranged within 7.5 hours at 60° C. After the agitator was shut off, a separation of the layers occurred. The chloroform extracts of both layers thus obtained yielded 22.5 g. cyclodecanol-(6)-one(1). In the oily phase 1.8 g. oxidocyclodecene were present so that, after hydration of the latter, a total oxyketone yield of 24.5 g. or 91 percent, at a residual peroxide content of 2.6 percent in the oily phase. The product distilled at 153–165° C./12 mm. Hg.

EXAMPLE 7

A suitable quantity of partly oxidized Decalin from an oxidation process as described in Example 3 was adjusted to a content of 50 percent peroxides by distillation of unchanged decahydronaphthalene. 60 g. of the residual oxidation solution were dissolved in 180 ml. glacial acetic acid and 2 ml. concentrated sulfuric acid; diluted in 20 ml. glacial acetic acid, were dropped in at 15° C. while cooling the mixture. After the reaction, the mixture was allowed to stand for several hours until practically all peroxide had been reacted. The sulfuric acid then was separated by means of sodium acetate, and the acetic acid, the decahydronaphthalene and the oxyketone-ester mixture, distilled. The latter mixture was saponified completely to oxyketone with NaOH. The sodium acetate thus formed may be reused for the neutralization of sulfuric acid in the next batch.

At an oxyketone-ester proportion as formed, calculated on an oxyketone content of approximately 1:2, the following reaction products were obtained by fractionating:

22.8 g. cyclodecanol-(6)-one(1) B.P. 156–165° C./12 mm. Hg 9.8 g. cyclodecanol-(6)-one(1)-acetate B.P. 150–155° C./12 mm. Hg Moreover, approximately 2.5 g. hyproducts formed consisting of 1,6-oxidocyclodecene; trans-9-decalol; and of a compound of undetermined structure which had a slightly higher boiling point than cyclodecanol-(6)-one(1). The saponification of the principal mixture with dilute NaOH yielded, after exhaustive extraction with CHCl₃, a total of 27 g. cyclodecanol-(6)-one(1) of a boiling point of 157–167° C./12 mm., corresponding to a yield of 90 percent.

EXAMPLE 8

To 500 ml. of a decahyronaphthalene oxidation solution produced as per Example 3, having a 70 g. trans-decalyl-9-hydroperoxide content per liter, 50 g. cyclodecanol-(6)-one(1) were added. This mixture then was emulsified with 500 ml. 70% phosphoric acid. The latter had previously been mixed with 50 ml. acetone. Emulsification was carried out at 150° C., within one hour with the use of a suitable mixer. After termination of the agitation, two layers formed which were extracted, as described in the previous examples, with chloroform and water, respectively. The extractions yielded a total extract of 71.6 hydroxycarbonyl compound. The yield on the latter was 21.6 g., having a boiling point of 153–165° C./12 mm. Hg, or 98 percent. The residual peroxide content in the decahydronaphthalene phase of 2.6 percent had been considered in the calculation.

EXAMPLE 9

10 g. of a mixture of 1,6-oxidocyclodecene-1 and decahydronaphthalene in a proportion of 4:6 were emulsified in 90 ml. 50% sulfuric acid containing 10 percent acetone, for 30 minutes at 150° C. The ensuing extraction with chloroform and distillation of the chloroform-decahydronaphthalene mixture, yielded 4.4 g. cyclodecanol-(6)-one(1) of a boiling range of 156–167° C./12 mm. Hg, or 98 percent.

EXAMPLE 10

800 ml. of a decahydronaphthalene oxidation solution having an approximate decalylperoxide content of 40 g./l. were washed first with 200 ml. 15% aqueous NaOH and then with a little water, and thereafter were concentrated to a peroxide content of 60 g./l. by distilling 300 ml. decahydronaphthalene therefrom. The rearrangement then was carried out by adding to the solution 500 ml. 50% sulfuric acid and 75 ml. acetone and emulsification while cooling and maintaining a temperature of 15° C. The rearrangement product distilled at 154–165° C./12 mm. Hg and had a yield of 97.5 percent at a residual peroxide content of 0.8 percent.

EXAMPLE 11

A decahydronaphthalene oxidation solution of 60 g. trans-decalyl-9-hydroperoxide content per liter continuously was taken from an oxidizer and treated countercurrently in a column with an equal volume 70% phosphoric acid containing 12.5 percent acetone, at 15–20° C., until a peroxide concentration of 0.8 percent was attained. The mineral acid subsequently was extracted continuously with a chloroform-acetone mixture having an acetone content of 16 percent, whereby the volume proportion of acid to extraction also was 1:1. The phosphoric acid was recirculated, by means of a pump, from the reaction column into the extraction column and back, while the decahydronaphthalene oxidation solution was circulated from the oxidation column into the reaction column. Prior to the recirculation into the oxidizer (working at temperatures of 100–120° C.), the acetone dissolved in the oxidation solution (approximately 2 percent) was removed therefrom by distillation and recycled into the reaction column. The chloroform-acetone extract mixture was passed through a column of granulated potash prior to distillation of the chloroform-acetone solvent mixture. A crude oxyketone extract of 495 g. corresponded to a throughput of 10 liters oxidation solution, amounting to a yield of 95 percent cyclodecanol-(6)-one(1). Its boiling range was 155–165° C./12 mm. Hg. The accompanying diagram in form of a flow sheet gives the details of the process.

I claim as my invention:

1. A process for the manufacture of cyclodecanol-(6)-one(1) which comprises treating decahydronaphthalene which has been partly oxidized with oxygen in liquid phase at temperatures of 110–130° C. and which has been neutralized, thus consisting, beside unchanged decahydronaphthalene, of 5–40 percent decalyl-9-peroxides in a ratio of trans-decalyl-9-hydroperoxide to isomeric peroxides of 50:1 to 1:0.5, and of small quantities of other oxidation products, with acid catalysts selected from the group consisting of phosphoric acid, polyphosphoric acid, pyrophosphoric acid, sulfuric acid, perchloric acid, acetic acid and mixtures of acetic acid with said acids named, plus an additional catalyst consisting of 2–15 percent acetone, in a heterogeneous dispersed phase having proportions of organic to acid phase thus formed of 1:1 to 1:10 volume parts at temperatures ranging from 0 to 80° C., the percentage of acetone being calculated on said acid phase; extracting the oxyketone thus formed from said acid phase continuously in a ratio of 1:1 to 1:4 with a chlorinated hydrocarbon, and recovering the same from the extract by distillation.

2. A continuous process for the manufacture of cyclodecanol-(6)-one(1) which comprises countercurrently treating decahydronaphthalene which has been partly oxidized with oxygen in liquid phase at temperatures of 110–130° C. and which has been neutralized, thus consisting, beside unchanged decahydronaphthalene, of 5–40 percent decalyl-9-peroxides in a ratio of trans-decalyl-9-hydroperoxide to associated isomeric peroxides of 50:1 to 1:0.5, and of small quantities of other oxidation products, with phosphoric acid of substantially 65–70 percent $H_3PO_4$ content plus 10 volume percent of acetone, calculated on said acid, in a heterogeneous dispersed phase having proportions of organic to acid phase thus formed of 1:1 to 1:2 at a reaction temperature of substantially 20° C.; continuously extracting the oxyketone thus formed from said acid phase in a ratio of 1:1 with a mixture of 89 volume percent chloroform and 11 volume percent acetone, the latter being in equilibrium with the acetone in the phosphoric acid, and recovering said oxyketone from the extract by distillation.

References Cited

UNITED STATES PATENTS 3,192,265   6/1965   Zehnder et al. _____ 260—586

OTHER REFERENCES

Bartlett et al., J. Am. Chem. Soc. vol. 75, pp. 5591 to 5, (1953).

Criegee et al., Justus Liebigs Ann. der Chemie vol. 560, pp. 127 to 130, (1948).

LEON ZITVER, Primary Examiner.

M. JACOB, Assistant Examiner.

U.S. Cl. X.R.

260—345.2, 488, 610, 617